(12) United States Patent  (10) Patent No.: US 8,621,490 B2
Billingsley  (45) Date of Patent: Dec. 31, 2013

(54) METHOD AND SYSTEM FOR USER-DESIGNED APPLICATION DEPLOYMENT

(75) Inventor: Eric Noel Billingsley, Campbell, CA (US)

(73) Assignee: eBay Inc., San Jose, CA (US)

( * ) Notice: Subject to any disclaimer, the term of this patent is extended or adjusted under 35 U.S.C. 154(b) by 1758 days.

(21) Appl. No.: 11/740,689

(22) Filed: Apr. 26, 2007

(65) Prior Publication Data

US 2007/0255826 A1 Nov. 1, 2007

Related U.S. Application Data

(60) Provisional application No. 60/745,989, filed on Apr. 28, 2006.

(51) Int. Cl.
*G06F 9/44* (2006.01)
*G06F 15/173* (2006.01)

(52) U.S. Cl.
USPC .......................................... 719/328; 709/226

(58) Field of Classification Search
USPC .......................................................... 719/328
See application file for complete search history.

(56) References Cited

U.S. PATENT DOCUMENTS

| | | | |
|---|---|---|---|
| 7,028,305 B2 | 4/2006 | Schaefer | |
| 2002/0184610 A1 | 12/2002 | Chong et al. | |
| 2003/0051070 A1* | 3/2003 | Shappir et al. | 709/328 |
| 2004/0021688 A1* | 2/2004 | Phillips | 345/762 |
| 2004/0201604 A1 | 10/2004 | Kraenzel et al. | |
| 2005/0144452 A1* | 6/2005 | Lynch et al. | 713/170 |
| 2005/0149543 A1* | 7/2005 | Cohen et al. | 707/100 |
| 2005/0160104 A1* | 7/2005 | Meera et al. | 707/100 |
| 2005/0204126 A1* | 9/2005 | Watson | 713/150 |
| 2006/0059107 A1 | 3/2006 | Elmore et al. | |
| 2006/0075407 A1 | 4/2006 | Powers et al. | |
| 2007/0021968 A1* | 1/2007 | Amir et al. | 705/1 |
| 2007/0255826 A1 | 11/2007 | Billingsley et al. | |

FOREIGN PATENT DOCUMENTS

| | | |
|---|---|---|
| WO | WO-0129728 A1 | 4/2001 |
| WO | WO-2007127350 A2 | 11/2007 |
| WO | WO-2007127350 A3 | 11/2007 |

OTHER PUBLICATIONS

Akihiko "Protecting resource with resource control lists".*
"European Application Serial No. 07776315.9, Search Report mailed on Oct. 9, 2009", 3 pgs.
"European Application Serial No. 07776315.9 Office Action mailed Oct. 16, 2009", 5 pgs.
"International Application Serial No. PCT/US2007/010201, International Preliminary Report on Patentability mailed Nov. 6, 2008", 11 pgs.
"International Application Serial No. PCT/US2007/010201, International Search Report and Written Opinion mailed Feb. 29, 2008", 15 pgs.

(Continued)

*Primary Examiner* — Lechi Truong
*Assistant Examiner* — Abdou Seye
(74) *Attorney, Agent, or Firm* — Schwegman Lundberg & Woessner, P.A.

(57) ABSTRACT

Embodiments of a method and system for utilizing user-designed applications are disclosed. A user-designed application that utilizes at least one high-level API available within a system may be received. The user-designed application may be deployed server-side within the system. A user request may be processed server-side for the user-designed application in the system.

30 Claims, 12 Drawing Sheets

(56) References Cited

OTHER PUBLICATIONS

Fox, A., et al., "Cluster Based Network services", *16 ACM Symposium*, (1997), 78-91.
"European Application Serial No. 07776315.9, Office Action Response filed Jul. 30, 2010", 4 pgs.
"European Application Serial No. 07776315.9, Office Action mailed Nov. 21, 2011", 4 pgs.
"European Application Serial No. 07776315.9, Response filed Apr. 2, 2012 to Office Action mailed Nov. 21, 2012", 12 pgs.
"European Application Serial No. 11185343.8, Extended European Search Report mailed Nov. 28, 2011", 8 pgs.
"International Application Serial No. PCT/US2007/010201, Written Opinion mailed Feb. 29, 2008", 8 pgs.

\* cited by examiner

METHOD AND SYSTEM FOR USER-DESIGNED APPLICATION DEPLOYMENT

PRIORITY CLAIM

This application claims the priority benefit of U.S. Provisional Application No. 60/745,989, filed 28 Apr. 2006, which is incorporated herein by reference.

TECHNICAL FIELD

The present application relates generally to the field of data processing and, in one specific example, to a method and system for user-designed application deployment.

BACKGROUND

Applications created by external developers to work with a system provided by another tend to be operated external to the system. The external developers incur the costs of running the created application including costs in trying to promote availability of the created application. The external developers may receive compensation from an operator of the system, from advertisers providing content to be available on the application, and the like. However, the compensation may be insufficient to cover the expenses incurred or to justify the development of a new application.

The external developers are not alone in increased cost. A significant issue for an operator of the system is that the use of many low-level application program interface (APIs) are needed by external developers to create an application with value. A developer may use a low-level API for each call to a server located in the system. For instance, a simple application may require one call to get information about a set of items, then calls for data about each item, then more calls for information about the users that created those items. So a simple search query could easily become a series of hundreds of remote API calls. If these calls had to be done sequentially, and each call took approximately 100 ms, such a page could take many minutes to create.

High-level API's, in contrast to the low-level API's, may handle the simple interactions of many lower-level APIs in a controlled way to minimize the number of sequential calls. The high-level APIs may include the many calls of the low-level APIs but may be optimized for performance (e.g., some of the calls may be performed simultaneously). However, because high-level APIs are typically created to address the performance issues of having a complex set of logic to render the final resultant data set, these higher-level APIs are often representative of very specific use-cases and may be unrelated to an application created an external developer. Because of this, an external developer may be limited to taking the data from an existing page and combining it with additional data on the client's side.

SUMMARY

Embodiments of a method and system for utilizing user-designed applications are disclosed. A user-designed application that utilizes at least one high-level API available within a system may be received. The user-designed application may be deployed server-side within the system. A user request may be processed server-side for the user-designed application in the system.

BRIEF DESCRIPTION OF THE DRAWINGS

Some embodiments are illustrated by way of example and not limitation in the figures of the accompanying drawings in which.

DETAILED DESCRIPTION

Example methods and systems for user-designed application deployment are described. In the following description, for purposes of explanation, numerous specific details are set forth in order to provide a thorough understanding of example embodiments. It will be evident, however, to one skilled in the art that the present invention may be practiced without these specific detail In an example embodiment, a user-designed interface that utilizes at least one high-level application program interface (API) may be received. The user-designed interface may be deployed server-side within a system. A user request may be processed server-side through the user-designed interface with a server in the system.

In an example embodiment, a user-designed application that utilizes at least one high-level application program interface (API) available within a system may be received. The user-designed application may be deployed server-side within the system. A user request may be processed server-side for the user-designed application in the system.

In an example embodiment, an access request may be received for a system. A user-designed interface deployed server-side within the system may be selected. A user request may be processed server-side through the user-designed interface with a server in the system.

In an example embodiment, a plurality of low-level application program interfaces (APIs) that communicate with a server in a system may be selected. The plurality of low-level APIs to be embodied as at least one high-level API. A user-designed interface capable of utilizing the at least one high-level API when deployed in the system may be created. The selection of the plurality of low-level APIs and the user-designed interface may be provided to an operator of the system.

Figure 1:
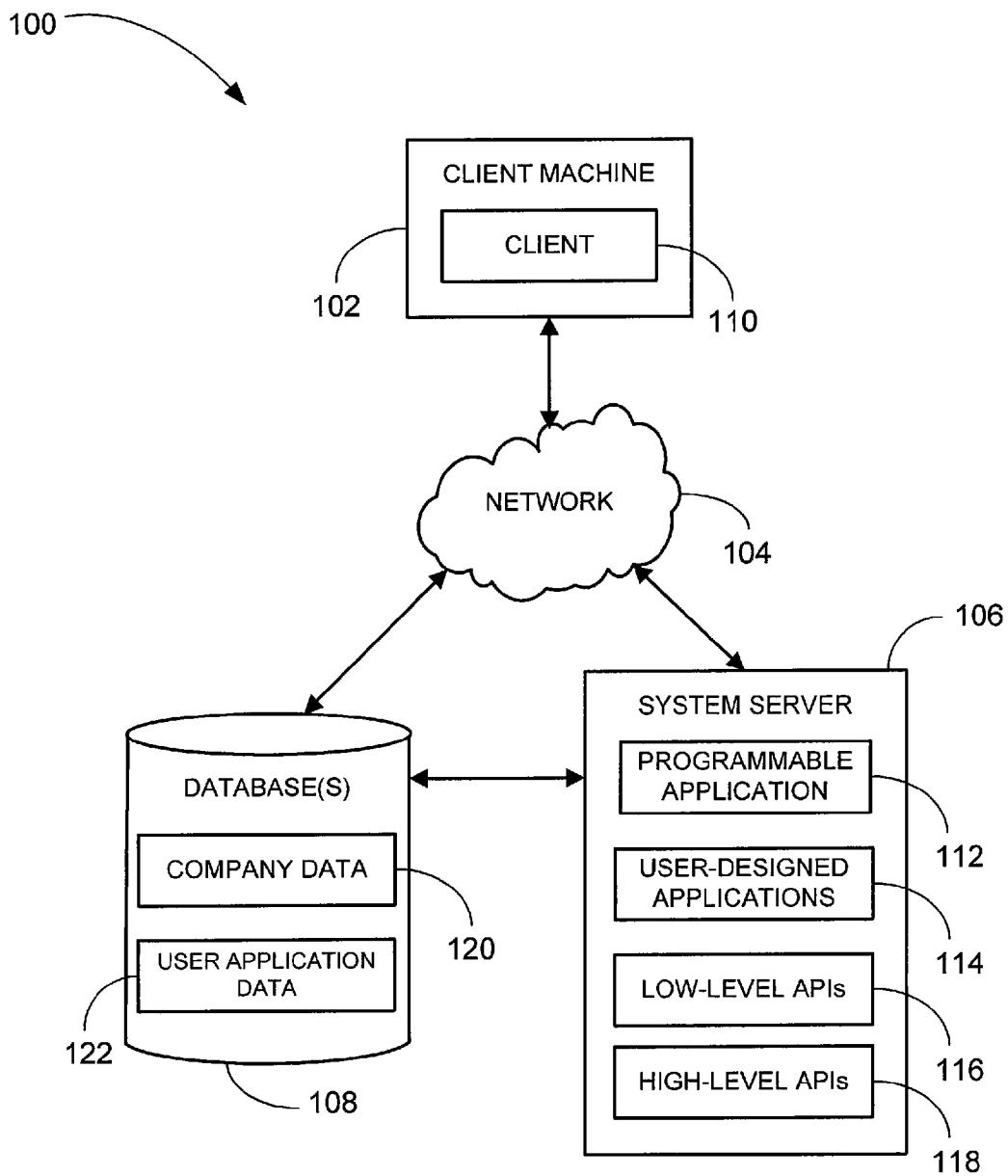
FIG. 1 is a block diagram of a system.

FIG. 1 illustrates a system 100 in which a client machine 102 may communicate over a network 104 with a system server 106. The network 104 may be a Global System for Mobile Communications (GSM) network, an Internet Protocol (IP) network, a Wireless Application Protocol (WAP) network, or a Wifi network, as well as various combinations thereof. Other conventional and/or later developed wired and wireless networks may also be used.

The system server 106 may make a user-designed application 114 available for use by the client 110 using a plurality of low-level application program interfaces (APIs) deployed as at least one-high level API 118. The user-designed applications 114 may be an application developed by external developers (e.g., not employees) that may deployed and utilized inside the system 100. The system server 106 may include a number of other components not shown, and may optionally be capable of load-balancing the programmable application 112 and/or the other components. An example embodiment of the programmable application 112 is described in greater detail below.

In an example embodiment, the user-designed applications 114 may be managed by the programmable application 112 to make optimized use of one or more resources within the system 100 according to a grid management framework. The grid management framework may be an enterprise grid alliance (EGA) framework that may be used to manage the user-designed applications 114 within the system 100. However, other frameworks that manage the user-designed applications 114 and other resources of the system 100 may also be used. The framework may optionally provide an execution space that may enforce the barriers and the privileges of the system 100 such as memory and CPU utilization restrictions, the ability to create threads, or the ability to access external data sources, and the like.

The user-designed application 114 may include a user-designed interface, an advertising application or other application that is available internally in the system server 106 to the client 110. The user-designed applications 114 may be serviced internally or externally.

The user-designed interface may include, by way of example, a customized interface, direct access to select items and/or groupings of items available within the system 100 (e.g., as company data 120 in a database 108) or another system, links to content available outside the system 100, and the like. By way of an example, a medical-oriented user interface may include links to medical items being sold at a variable price and a fixed price within the system 100, stores available from other users with the system 100 that are selling medial items, reviews of the medical items, and other medical information. The user-designed application 114 may increase the likelihood that a transaction within the system 100 will be conducted by a user of the user-designed application 114.

The low-level APIs 116 may expose a single function or sets of functions available within the system server 106. Examples of functionality provided by the low-level APIs 116 may include, by way of example, access to company data 120 (e.g., records) in the database 108 or transformation of one format of data into another form. The low-level APIs 116 may be, in an example embodiment, a getItem or getUserAPI call. However, other types of functionality and other API calls may also be used. Available low-level APIs 116 in the system 100 may be made available to a developer in the form a Software Development Kit (SDK) that the developer can develop against or otherwise.

The user-designed application 114 may avoid latency when utilizing at least one high-level API 118 as opposed to the plurality of low-level APIs 116. A high-level API 118 may, for example, may implement fifty calls of a plurality of low-level APIs 116 to the system 100 in a single call. The high-level APIs 118 may handle simple interactions of lower-level data in a controlled way to minimize the number of sequential calls.

The client machine 102 may present the received content on a user interface to a user (e.g., on a display) through a client 110. The content may include, by way of example, items available for purchase at a fixed or variable fee, information regarding a number of items, links to websites and other network resources, and the like. Examples of the client machine 102 include a set-top box, a receiver card, a mobile phone, and a computing system; however other devices may also be used.

The database 108 may include company data 120 and/or user application data 122. The user application data 122 may be code (e.g., source and/or object code) that may be used to implement the functionality of the user-designed applications 114, low-level APIs 116, and/or the high-level APIs 118. The company data 120 may be provided to the client 110 for presentation to a user within the user-designed applications 114. For clarity and conciseness one database 108 is illustrated. However, multiple databases 108 may be employed as may be desired.

Figure 2:
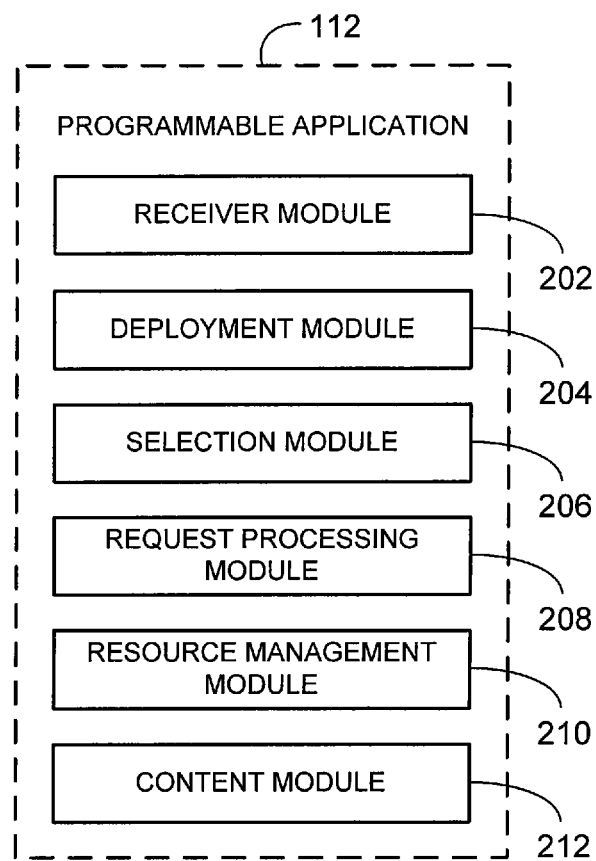
FIG. 2 is an example programmable application that may be deployed within the system of FIG. 1.

FIG. 2 illustrates an example programmable application 112 (see FIG. 1) that may be deployed in the system 100 or in another system. The programmable application 112 may include a receiver module 202, a deployment module 204, a selection module 206, a request processing module 208, a resource management module 210, and/or a content module 212. However, other modules may also be used.

The receiver module 202 receives a user-designed application 114 that utilizes at least one high-level API available within the system 100. The deployment module 204 deploys the user-designed application 114 server-side within the system 100.

The selection module 206 selects a user-designed application deployed server-side within the system 100. The request processing module 208 processes a user request server-side for the user-designed application 114 in the system 100.

The resource management module 210 manages one or more resources associated with the user-designed application 114. The content module 212 provides content through a user-designed application 114 (e.g., the user-designed interface) in response to processing the user request and/or denies access through the user-designed application 114 when utilization of the one or more resources of the system 100 exceed a system threshold.

Figure 3:
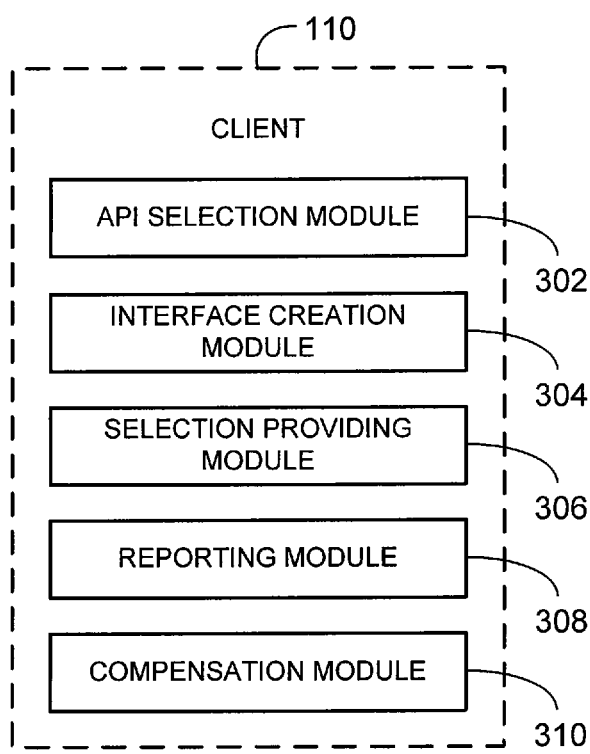
FIG. 3 is an example client that may be deployed within the system of FIG. 1.

FIG. 3 illustrates an example client 110 (see FIG. 1) that may be deployed in the system 100 or in another system. The programmable application 112 may an API selection module 302, an interface creation module 304, a selection providing module 306, a reporting module 308, and/or a compensation module 310. However, other modules may also be used.

The API selection module 302 selects a plurality of low-level APIs that communicate with the system server 106 in the system 100 to be embodied as at least one high-level API 118. The interface creation module 304 creates a user-designed interface capable of utilizing the at least one high-level API 118 when deployed in the system 100.

The selection providing module 306 provides the selection of the plurality of low-level APIs 116 and the user-designed interface to the system 100. The reporting module 308 receives a report of utilization of resources of the system 100 by the user-designed interface. The compensation module 310 receives compensation from an operator of the system 100.

Figure 4:
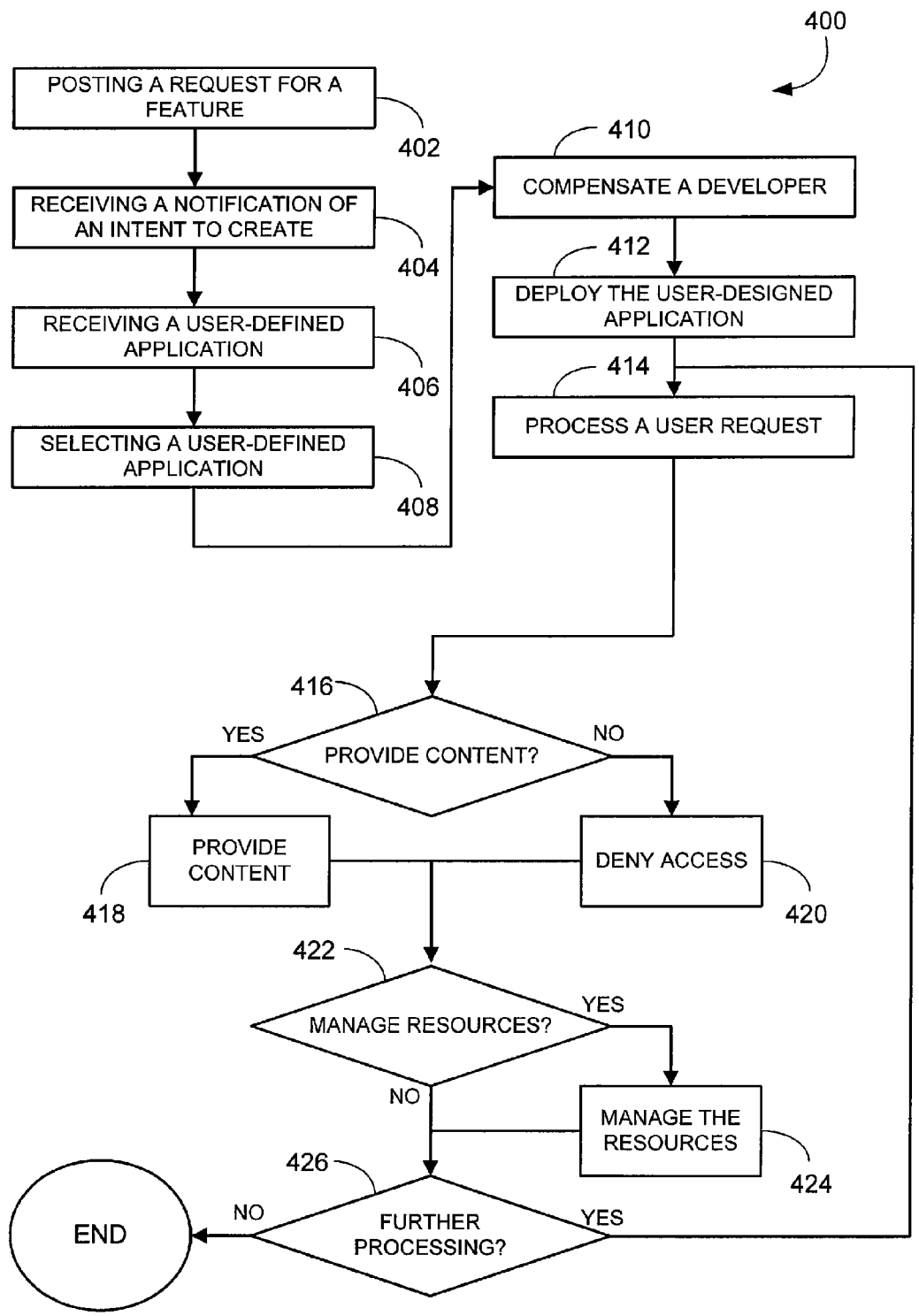
FIG. 4 is a flowchart illustrating a method for utilizing a user-designed application according to an example embodiment.

FIG. 4 illustrates a method 400 for utilizing a user-designed application 114 (see FIG. 1) according to an example embodiment. The user-designed application 114 may be utilized in the system 100 or in another system.

A request for a feature that utilizes at least one high-level API 118 available within the system 100 may optionally be posted at block 402. The posted request may include desired features and/or functionality (e.g., a specially designed user interface for medical equipment) to be provided with the system 100 by an external developer.

In response to the post, a notification of intent to create a user-designed application 114 that implements the feature may be received at block 404. The notification may be provided by one or more external developers.

At least one user-designed application 114 that utilizes at least one high-level API 118 available within the system 100 (e.g., in the system server 106) may be received from one or more external developers at block 406. The user-designed application 114 may be received from the provider of the notification and may implement the feature as posted (see block 402).

In an example embodiment, programmable code may be received for a service from the external developer, the programmable code may be compiled, and a user-designed application 114 that utilizes the at least one high-level API and the compiled code may be received. The original source and the compiled version of the code may optionally both be stored in the database 108 (e.g., as user application data 122) to enable load-balanced application handling by a distributed subsystem of the system 100.

A user-designed application 114 may be selected at block 408. The selected user-designed application may satisfy an acceptance criterion, and may be selected from among a plurality of user-designed applications 114 provided for possible deployment.

In an example embodiment, a plurality of designed applications may be received from a plurality of external developers that utilize at least one high-level API 118 available within the system 100 and implement the feature. A selection of a user-designed application 114 may be made from the received designed applications.

A developer of the user-designed application may optionally be compensated at block 410. For example, the developer may be compensated when the user-designed application 114 satisfies an acceptance criterion set by an operator of the system 100.

The user-designed application 114 may be deployed server-side within the system 100 at block 412 to enable processing of a user request server-side at block 414.

A determination may be made at decision block 416 whether to provide content in response to the user request. If a determination is made to provide content, content may be provided from the user-designed application in response to processing the user request at block 418. If a determination is made at decision block 416 not to provide content, access to content from the user-designed application 114 may be denied. For example, access may be denied when the utilization of the resources of the system 100 exceed a system threshold. The resources may include, by way of example, a number of cycles of a central processing unit (CPU), a memory, and/or a number of system calls. Upon completion of the operations at block 418 or block 420, the method 400 may proceed to decision block 416.

At decision block 422, a determination made may be made whether to manage one or more resources of the system 100. If a determination is made to manage the resources, one or more resources of the system 100 may be managed at block 424. For example, the one or more resources associated with the user-designed application may optionally be managed in the grid management framework of the system 100. If a determination is made not to manage the resources at decision block 422 or upon completion of the operations at block 424, the method 600 may proceed to decision block 426.

A determination may be made at decision block 426 whether to perform further processing. If a determination is made to perform further processing, the method 400 may return to block 414. If a determination is made not to perform further processing at decision block 426, the method 400 may terminate.

In an example embodiment, the method 400 may provide a development opportunity for community driven innovation. For example, an external developer may create an interesting application for listing, presenting and ordering for a computer. By enabling the external developer to upload code and to use a reference to that code from other parts of an existing website infrastructure, it may be possible for an operator to fully integrate, serve and manage this functionality from within the system 100.

Figure 5:
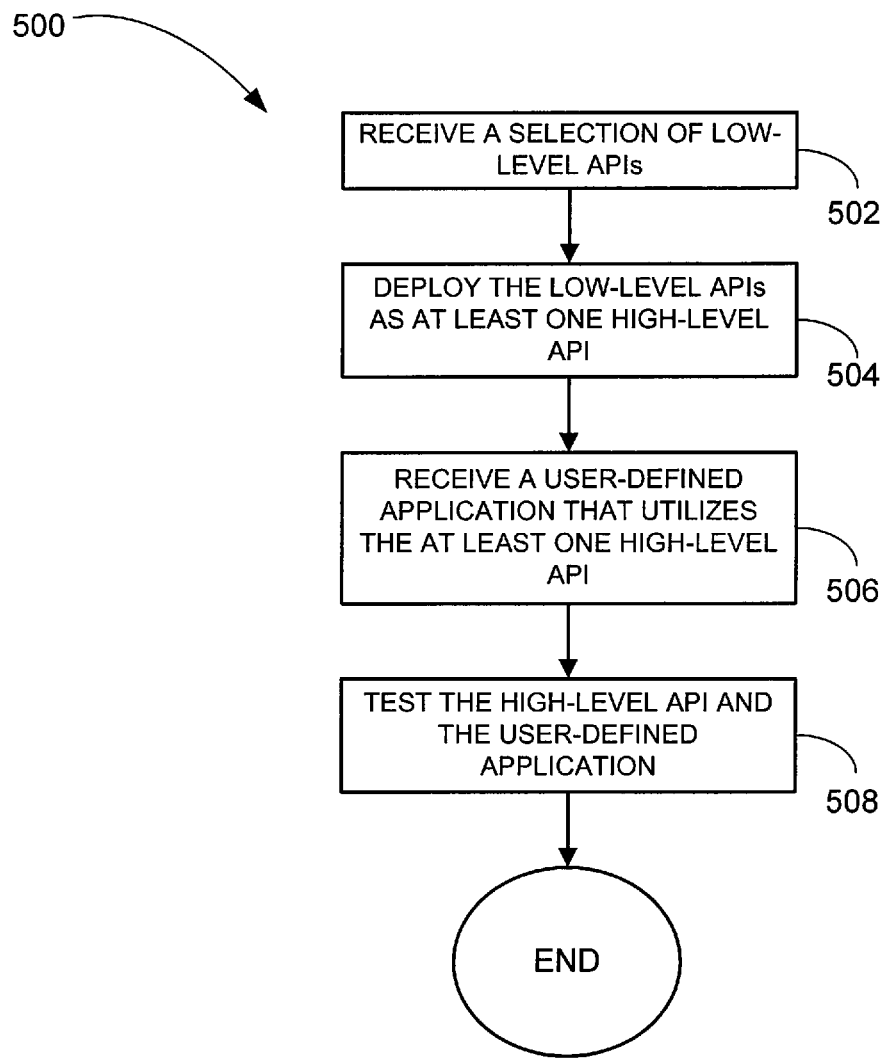
FIG. 5 is a flowchart illustrating a method for receiving a user-designed application according to an example embodiment.

FIG. 5 illustrates a method 500 for receiving a user-designed application 114 (see FIG. 1) according to an example embodiment. In an example embodiment, the method 500 may be performed at block 406 (see FIG. 4).

A selection of a plurality of low-level APIs 116 that communicate with the system server 106 in the system 100 may be received at block 502. The selection may optionally include an acceptable API specification from the external developer.

The plurality of low-level APIs 116 may be deployed as at least one high-level API 118 in the system 100 at block 504. The plurality of low-level APIs 116 may be packaged or otherwise associated together as the at least one high-level API 118 for deployment. The deployment of the at least one high-level API 118 within the system 100 may enable more efficient processing of requests in the system 100 as compared to processing requests with the plurality of low-level APIs 116. In an example embodiment, the at least one high-level API 118 may be defined by the client 110 by running generated code within the programmable application 112 and using the business objects and methods of the system 100.

In an example embodiment, by moving the logic of how to deal with the external data model from the client-side to the system-side of the system 100 and presenting only the data that is of interest to the client 110, stabilization of the user-designed application 114 may be achieved, while also granting flexibility to the external developer.

In an example embodiment, the at least one high-level API 118 may optionally be granted authorization to interact with various objects and methods and potentially designate different service levels to different users. These authorizations may be aggregated into certain pre-defined roles such as business partner or public.

A user-designed application 114 that utilizes the at least one high-level API 118 may be received at block 506. The at least one high-level API and the user-designed application 114 may optionally be tested server-side in the system 100 at block 508. The testing may insure ensure compliance, reliability and/or performance with the system 100.

Figure 6:
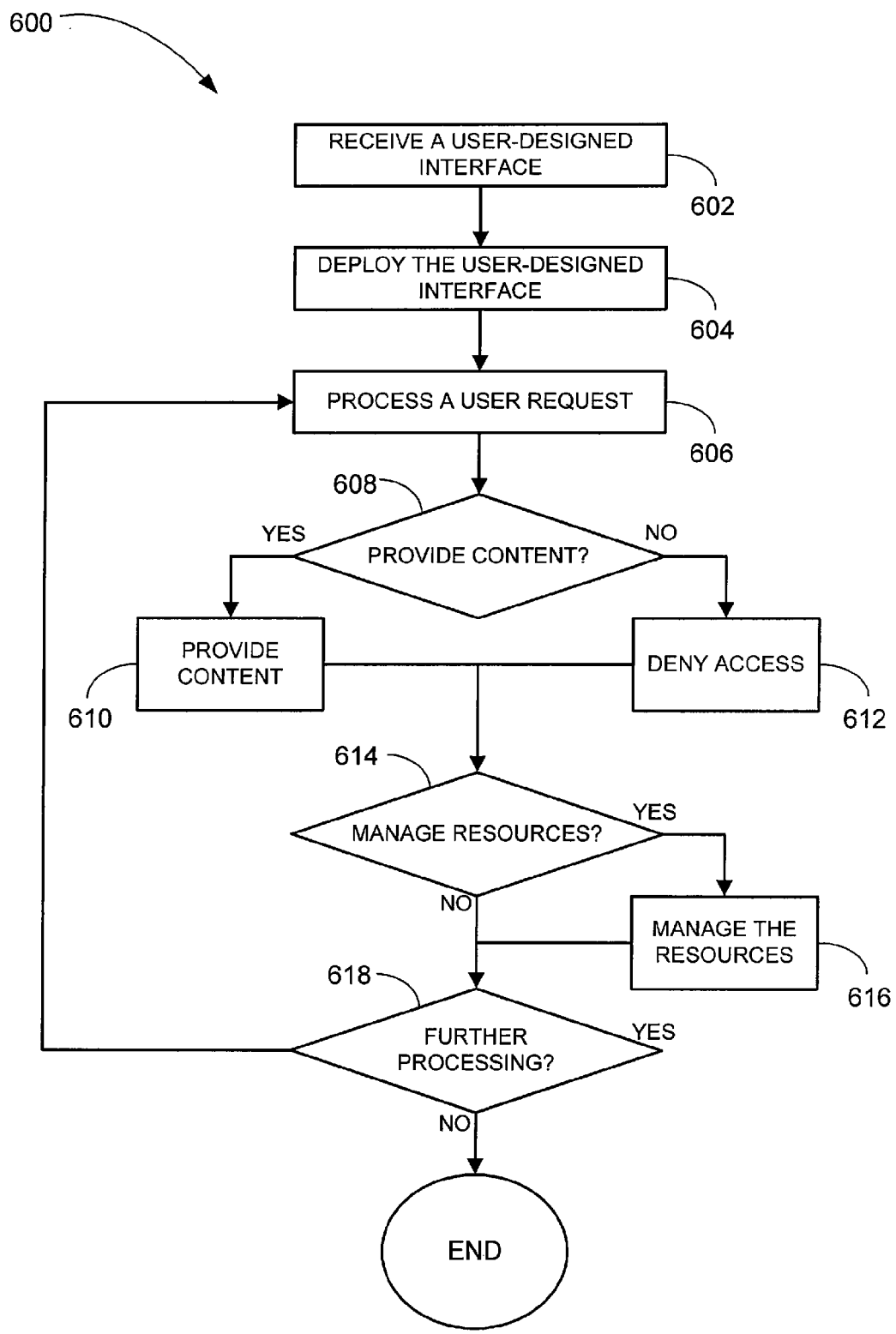
FIG. 6 is a flowchart illustrating a method for utilizing a user-designed interface according to an example embodiment.

FIG. 6 illustrates a method 600 for utilizing a user-designed interface according to an example embodiment. The user-designed interface may be utilized in the system 100 or in another system.

A user-designed interface that utilizes at least one high-level API may be received at block 602. The user-designed interface may be deployed server-side within the system 100 at block 604 and may optionally include user-provided content. The user-designed interface may provide a different, compelling, and/or unique experience to a user relative to a standard interface available with the system 100.

A user request may be processed server-side through the user-designed interface with the system server 106 in the system 100 at block 606. The user request may include, by way of an example, a selection of an item for purchase or a selection of an item for bid.

A determination may be made at decision block 608 whether to provide content. If a determination is made to provide content, content may be provided through the user-designed interface in response to processing the user request at block 610. If a determination is made at decision block 608 not to provide content, access to content through the user-designed interface may be denied. For example, access may be denied when the utilization of the resources of the system 100 exceeds a system threshold. Upon completion of the operations at block 610 or block 612, the method 600 may proceed to decision block 614.

At decision block 614, a determination made may be made whether to manage one or more resources of the system 100. If a determination is made to manage the resources, one or more resources of the system 100 may be managed at block 616. If a determination is made not to manage the resources at decision block 614 or upon completion of the operations at block 616, the method 600 may proceed to decision block 618.

A determination may be made at decision block 618 whether to perform further processing. If a determination is made to perform further processing, the method 600 may return to block 606. If a determination is made not to perform further processing at decision block 618, the method 600 may terminate.

Figure 7:
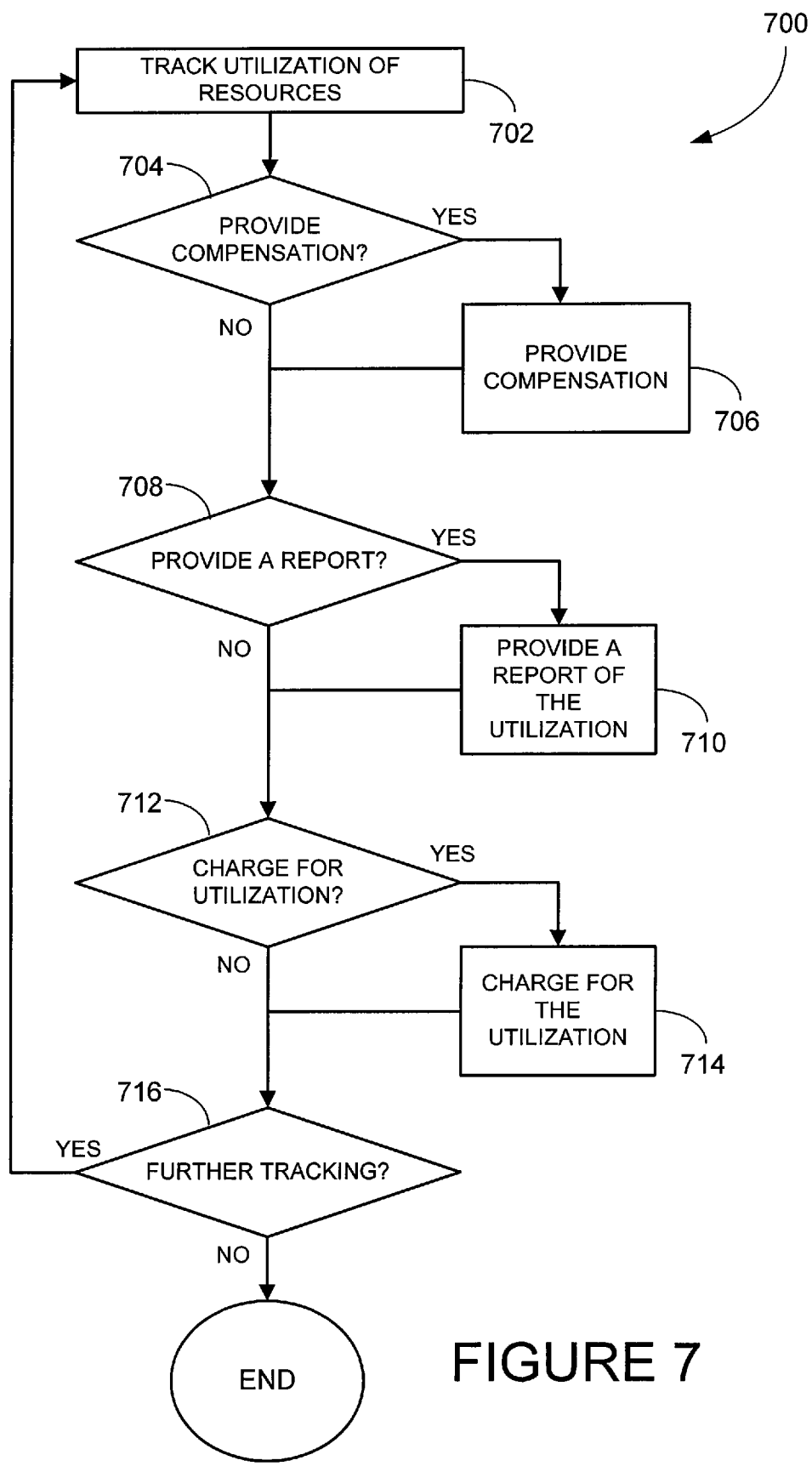
FIG. 7 is a flowchart illustrating a method for managing one or more resources according to an example embodiment.

FIG. 7 illustrates a method 700 for managing one or more resources in the system 100. In an example embodiment, the method 700 may be performed at block 424 and/or block 616 (see FIGS. 4 and 6).

Utilization of one or more resources of the system 100 used by the user-designed interface may be tracked at block 702. The tracking may be in the form a utilization profile of the user-designed interface or may be otherwise tracked.

A determination may be made at decision block 704 whether to provide compensation. If a determination is made to provide compensation, an external developer of the user-designed application 114 may optionally be provided compensation (e.g., directly to the developer or a person or organization designated by the developer) at block 706. The compensation may be based on, by way of example, the utilization of the resources by the user-designed application and/or a number of transactions using the user-designed application. The compensation may be provided by an operator (e.g., dynamically by a compensation application or manually by a user) of the system 100, a lister of an item available in the system 100 through the user-designed application, and/or a purchaser of the item through the user-designed application.

Providing compensation to the external developer of the user-designed application may encourage other developers to create user-designed applications for deployment within the system 100, thereby increasing the functionality of the system 100 and reducing the development cost of additional functionality of the system 100. The developer of the user-designed application may not need to make an effort to market the user-designed application 114 to receive compensation, as the system 100 and/or users of the system 100 may promote the use of the user-designed application 114. The compensation may reflect a value that the user-designed application 114 has contributed to the system 100.

Providing compensation to an organization with whom the user-designed application 114 is associated (e.g., as designated by the external developer and/or an operator of the system 100 may encourage users to utilize the user-designed application to generate revenue for the organization.

The tracked utilization of resources consumed by the user-designed application 114 may optionally be used in determining compensation so that the external developer is only compensated for additional value added as a result of the deployed user-designed application 114. In an example embodiment, when compensation is provided based on resource use of the system 100 versus revenue received (e.g., purchases of items) through use of the user-designed application 114, the operator may only compensate external developers that have provided value to the system 100. For example, the value may be an increased amount of transaction dollars relative to resource cost.

If a determination is made at decision block 704 not to provide compensation or upon completion of the operations at block 706, the method 700 may proceed to decision block 708.

At decision block 708, a determination may be made as to whether a report may be provided. If a determination is made to provide a report, a report of the utilization of the resources may be provided at block 710 to the external developer or another designated party. The report may, by way of an example, enable the external developer to determine if the user-designed application 114 should be modified to run using fewer resources so that additional compensation may be received. If at decision block 708 a determination is made not to provide the report or upon completion of the operations at block 710, the method 700 may proceed to decision block 712.

A determination may be made at decision block 712 whether to charge for utilization of the user-designed application 114. If a determination is made to charge, a charge may be made for the utilization of the resources of the system 100 beyond a system threshold. If at decision block 712 a determination is made not to charge or upon completion of the operations at block 714, the method 700 may proceed to decision block 716.

At decision block 716, a determination may be made whether to perform further tracking. If further tracking is to be performed, the method 700 may return to block 702. If a determination is made at decision block 716 that further tracking is not to be performed, the method 700 may terminate.

The determinations made at decision blocks 704, 708, 712 may occur in any order including multiple decision blocks occurring in parallel.

Figure 8:
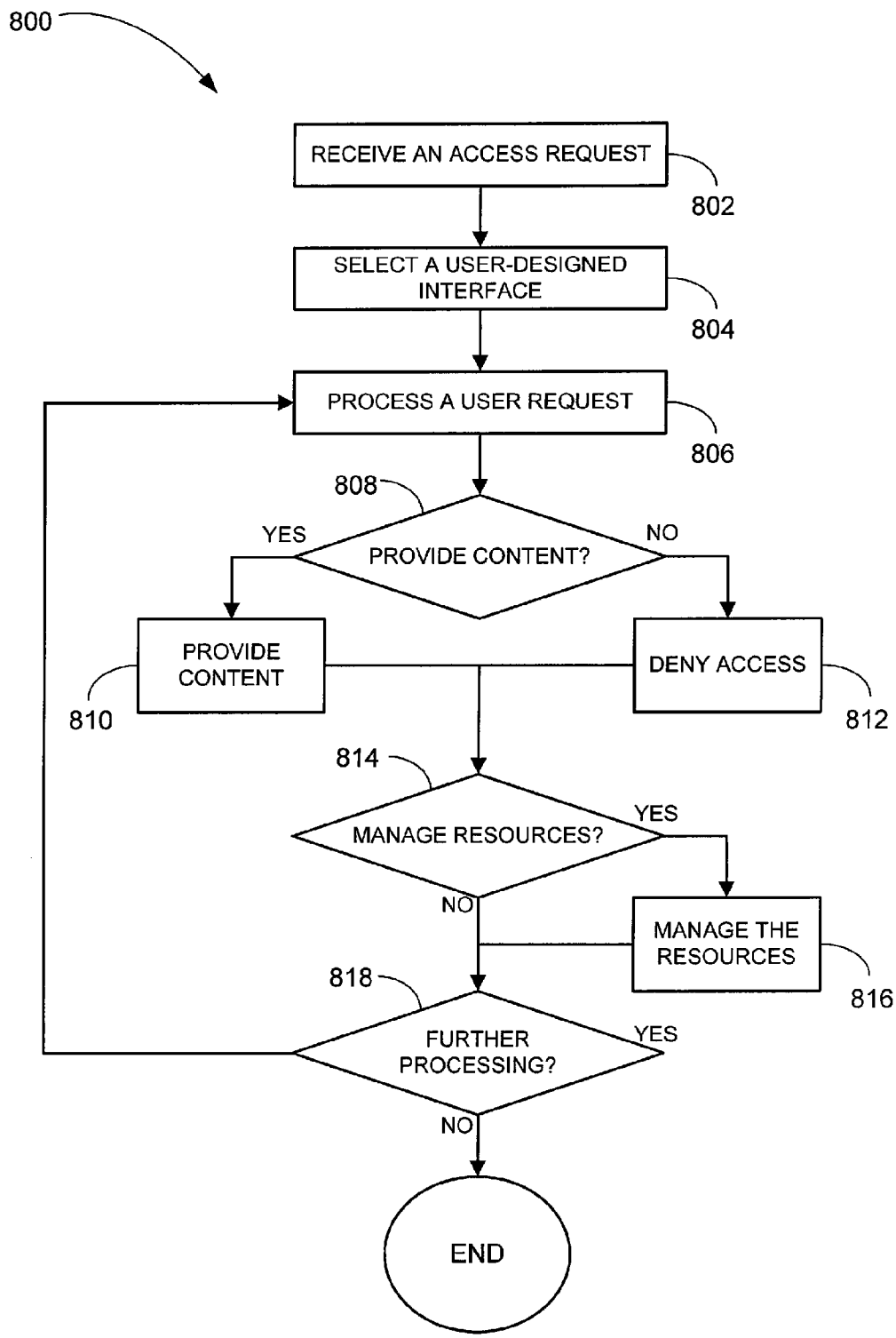
FIG. 8 is a flowchart illustrating a method for using a user-designed interface according to an example embodiment.

FIG. 8 illustrates a method for using a user-designed interface according to an example embodiment. The user-designed interface may be deployed in the system 100 (see FIG. 1) or in another system.

An access request may be received for the system 100 at block 802

A user-designed interface deployed server-side within the system 100 may be selected at block 804. The selection may be a dynamic selection using, by way of an example, a genetic algorithm. The selection may also be made by the user, and recommendations may be provided to a user of one or more user-designed interfaces that may be of interest to the user and available within the system 100.

In an example embodiment, a plurality of available user-designed interfaces deployed server-side within the system 100 may be identified and a selection of a user-designed interface from the plurality of available user-designed interface may be received.

A user request may be processed server-side through the user-designed interface with the system server 106 in the system 100 at block 806.

A determination may be made at decision block 808 whether to provide content. If a determination is made to provide content, content may be provided through the user-designed interface in response to processing the user request at block 810. If a determination is made at decision block 808 not to provide content, access to content through the user-designed interface may be denied. For example, access may be denied when the utilization of the resources of the system 100 exceeds a system threshold, when a charge for utilization has not been paid, and the like. Upon completion of the operations at block 810 or block 812, the method 800 may proceed to decision block 814.

At decision block 814, a determination made may be made whether to manage one or more resources of the system 100. If a determination is made to manage the resources, one or more resources of the system 100 may be managed at block 816. If a determination is made not to manage the resources at decision block 814 or upon completion of the operations at block 816, the method 800 may proceed to decision block 818.

A determination may be made at decision block 818 whether to perform further processing. If a determination is made to perform further processing, the method 800 may return to block 806. If a determination is made not to perform further processing at decision block 818, the method 800 may terminate.

Figure 9:
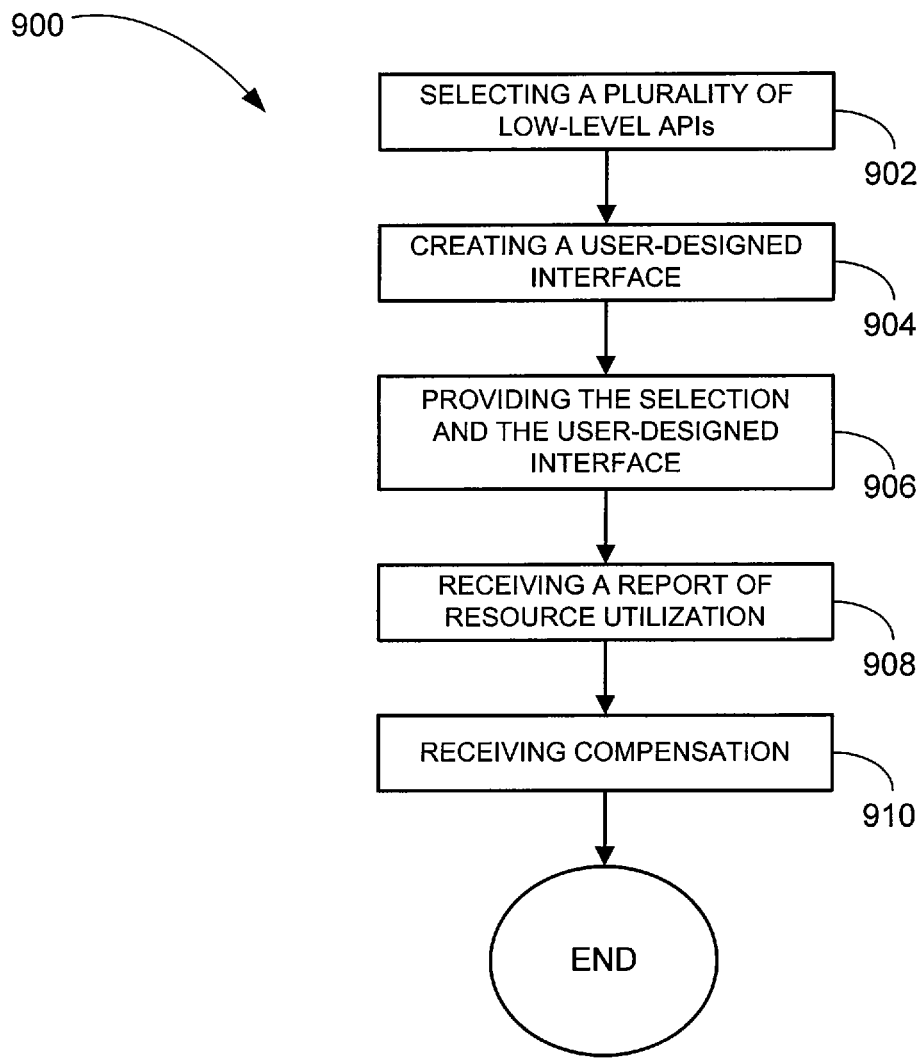
FIG. 9 is a flowchart illustrating a method for using a client according to an example embodiment.

FIG. 9 illustrates a method for using the client 110 (see FIG. 1). The client 110 may be used in the system 100 or in another system.

A plurality of APIs 116 that communicate with the system server 106 in the system 100 may be selected at block 902. For example, an external developer may cause the selection of the low-level APIs 116 so that the programmable application 112 may embody the plurality of low-level APIs 116 as at least one high-level API 118.

A user-designed interface capable of utilizing the at least one high-level API 118 when deployed in the system 100 may be created at block 904. For example, a same external developer or a different external developer that caused the creation of the at least one high-level API 118 may cause the creation of the user-designed interface.

The selection of the plurality of low-level APIs 116 and the user-designed interface may be provided from the client 110 (see FIG. 1) to an operator (e.g., the programmable application 112 for dynamic deployment or a person for manual deployment) of the system 100 at block 906.

A report of utilization of one or more resources of the system 100 by the user-designed interface may optionally be received at block 908

Compensation from the operator of the system 100 may optionally be received at block 910.

Figure 10:
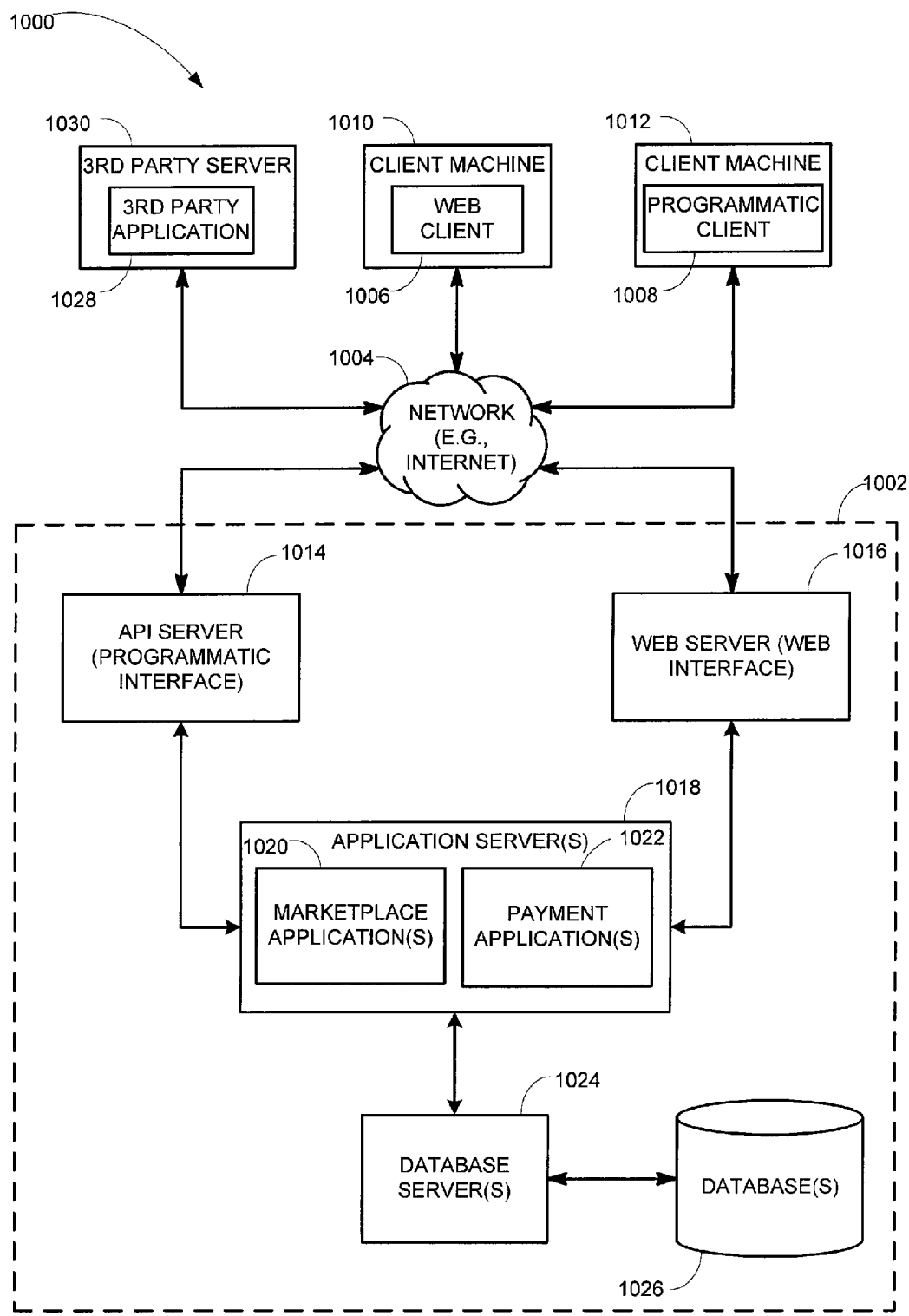
FIG. 10 is a network diagram depicting a network system, according to one embodiment, having a client server architecture configured for exchanging data over a network.

FIG. 10 is a network diagram depicting a client-server system 1000, within which one example embodiment may be deployed. For example, the system 1000 may be deployed with the client-server system 1000 or another system.

A networked system 1002, in the example forms of a network-based marketplace or publication system, provides server-side functionality, via a network 1004 (e.g., the Internet or Wide Area Network (WAN)) to one or more clients. FIG. 10 illustrates, for example, a web client 1006 (e.g., a browser, such as the Internet Explorer browser developed by Microsoft Corporation of Redmond, Wash. State), and a programmatic client 1008 executing on respective client machines 1010 and 1012.

An Application Program Interface (API) server 1014 and a web server 1016 are coupled to, and provide programmatic and web interfaces respectively to, one or more application servers 1018. The application servers 1018 host one or more marketplace applications 1020 and payment applications 1022. The application servers 1018 are, in turn, shown to be coupled to one or more databases servers 1024 that facilitate access to one or more databases 1026.

The marketplace applications 1020 may provide a number of marketplace functions and services to users that access the networked system 1002. The payment applications 1022 may likewise provide a number of payment services and functions to users. The payment applications 1022 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 1020. While the marketplace and payment applications 1020 and 1022 are shown in FIG. 10 to both form part of the networked system 1002, in alternative embodiments the payment applications 1022 may form part of a payment service that is separate and distinct from the networked system 1002.

Further, while the system 1000 shown in FIG. 10 employs a client-server architecture, the present invention is of course not limited to such an architecture, and could equally well find application in a distributed, or peer-to-peer, architecture system, for example. The various marketplace and payment applications 1020 and 1022 could also be implemented as standalone software programs, which do not necessarily have networking capabilities.

The web client 1006 accesses the various marketplace and payment applications 1020 and 1022 via the web interface supported by the web server 1016. Similarly, the programmatic client 1008 accesses the various services and functions provided by the marketplace and payment applications 1020 and 1022 via the programmatic interface provided by the API server 1014. The programmatic client 1008 may, for example, be a seller application (e.g., the TurboLister application developed by eBay Inc., of San Jose, Calif.) to enable sellers to author and manage listings on the networked system 1002 in an off-line manner, and to perform batch-mode communications between the programmatic client 1008 and the networked system 1002.

FIG. 10 also illustrates a third party application 1028, executing on a third party server machine 1030, as having programmatic access to the networked system 1002 via the programmatic interface provided by the API server 1014. For example, the third party application 1028 may, utilizing information retrieved from the networked system 1002, support one or more features or functions on a website hosted by the third party. The third party may, for example, provide one or more promotional, marketplace or payment functions that are supported by the relevant applications of the networked system 1002.

Figure 11:
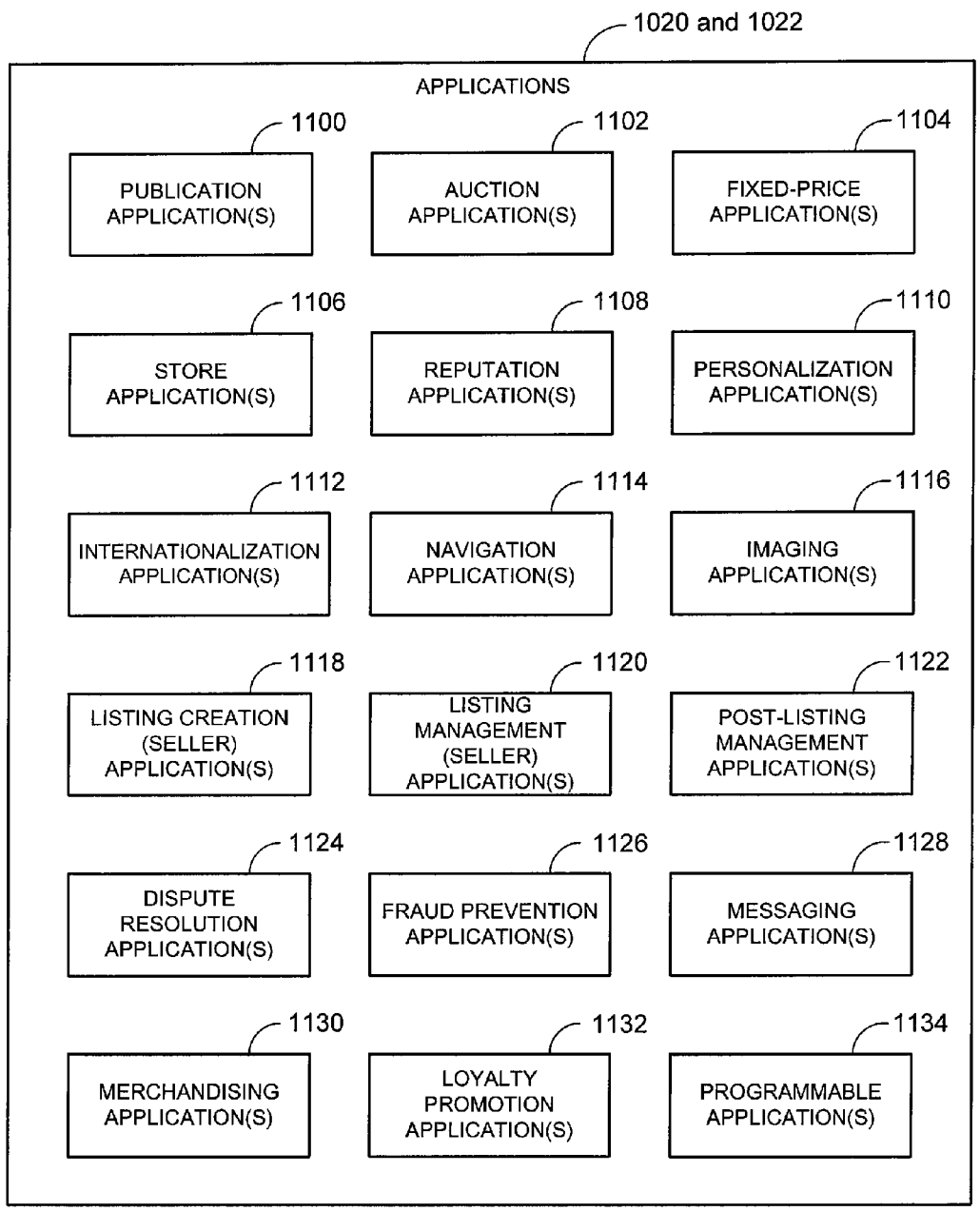
FIG. 11 is a block diagram illustrating an example embodiment of multiple network and marketplace applications, which are provided as part of the network-based marketplace.

FIG. 11 is a block diagram illustrating multiple applications 1020 and 1022 that, in one example embodiment, are provided as part of the networked system 1002 (see FIG. 1). The applications 1020 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 1026 via the database servers 1024.

The networked system 1002 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 1020 are shown to include at least one publication application 1100 and one or more auction applications 1102 which support auction-format listing and price setting mechanisms (e.g., English, Dutch, Vickrey, Chinese, Double, Reverse auctions etc.). The various auction applications 1102 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 1104 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 1106 allow a seller to group listings within a "virtual" store, which may be branded and otherwise personalized by and for the seller. Such a virtual store may also offer promotions, incentives and features that are specific and personalized to a relevant seller.

Reputation applications 1108 allow users that transact, utilizing the networked system 1002, to establish, build and maintain reputations, which may be made available and published to potential trading partners. Consider that where, for example, the networked system 1002 supports person-to-person trading, users may otherwise have no history or other reference information whereby the trustworthiness and credibility of potential trading partners may be assessed. The reputation applications 1108 allow a user, for example through feedback provided by other transaction partners, to establish a reputation within the networked system 1002 over time. Other potential trading partners may then reference such a reputation for the purposes of assessing credibility and trustworthiness.

Personalization applications 1110 allow users of the networked system 1002 to personalize various aspects of their interactions with the networked system 1002. For example a user may, utilizing an appropriate personalization application 1110, create a personalized reference page at which information regarding transactions to which the user is (or has been) a party may be viewed. Further, a personalization application 1110 may enable a user to personalize listings and other aspects of their interactions with the networked system 1002 and other parties.

The networked system 1002 may support a number of marketplaces that are customized, for example, for specific geographic regions. A version of the networked system 1002 may be customized for the United Kingdom, whereas another version of the networked system 1002 may be customized for the United States. Each of these versions may operate as an independent marketplace, or may be customized (or internationalized and/or localized) presentations of a common underlying marketplace. The networked system 1002 may accordingly include a number of internationalization applications 1112 that customize information (and/or the presentation of information) by the networked system 1002 according to predetermined criteria (e.g., geographic, demographic or marketplace criteria). For example, the internationalization applications 1112 may be used to support the customization of information for a number of regional websites that are operated by the networked system 1002 and that are accessible via respective web servers 1016.

Navigation of the networked system 1002 may be facilitated by one or more navigation applications 1114. For example, a search application (as an example of a navigation application) may enable key word searches of listings published via the networked system 1002. A browse application may allow users to browse various category, catalogue, or system inventory structures according to which listings may be classified within the networked system 1002. Various other navigation applications may be provided to supplement the search and browsing applications.

In order to make listings, available via the networked system 1002, as visually informing and attractive as possible, the marketplace applications 1020 may include one or more imaging applications 1116 utilizing which users may upload images for inclusion within listings. An imaging application 1116 also operates to incorporate images within viewed listings. The imaging applications 1116 may also support one or more promotional features, such as image galleries that are presented to potential buyers. For example, sellers may pay an additional fee to have an image included within a gallery of images for promoted items.

Listing creation applications 1118 allow sellers conveniently to author listings pertaining to goods or services that they wish to transact via the networked system 1002, and listing management applications 1120 allow sellers to manage such listings. Specifically, where a particular seller has authored and/or published a large number of listings, the management of such listings may present a challenge. The listing management applications 1120 provide a number of features (e.g., auto-relisting, inventory level monitors, etc.) to assist the seller in managing such listings. One or more post-listing management applications 1122 also assist sellers with a number of activities that typically occur post-listing. For example, upon completion of an auction facilitated by one or more auction applications 1102, a seller may wish to leave feedback regarding a particular buyer. To this end, a post-listing management application 1122 may provide an interface to one or more reputation applications 1108, so as to allow the seller conveniently to provide feedback regarding multiple buyers to the reputation applications 1108.

Dispute resolution applications 1124 provide mechanisms whereby disputes arising between transacting parties may be resolved. For example, the dispute resolution applications 1124 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 1126 implement fraud detection and prevention mechanisms to reduce the occurrence of fraud within the networked system 1002.

Messaging applications 1128 are responsible for the generation and delivery of messages to users of the networked system 1002, such messages for example advising users regarding the status of listings at the networked system 1002 (e.g., providing "outbid" notices to bidders during an auction process or to provide promotional and merchandising information to users). Respective messaging applications 1128 may utilize any one have a number of message delivery networks and platforms to deliver messages to users. For example, messaging applications 1128 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 1130 support various merchandising functions that are made available to sellers to enable sellers to increase sales via the networked system 1002. The merchandising applications 1130 also operate the various merchandising features that may be invoked by sellers, and may monitor and track the success of merchandising strategies employed by sellers.

The networked system 1002 itself, or one or more parties that transact via the networked system 1002, may operate loyalty programs that are supported by one or more loyalty/promotions applications 1132. For example, a buyer may earn loyalty or promotions points for each transaction established and/or concluded with a particular seller, and be offered a reward for which accumulated loyalty points can be redeemed.

The programmable applications 1134 may include the functionality of the programmable application 112 (see FIG. 1). For example, the user designed applications may enable the client 110 to communicate with one or more of the applications 1100-1134.

Figure 12:
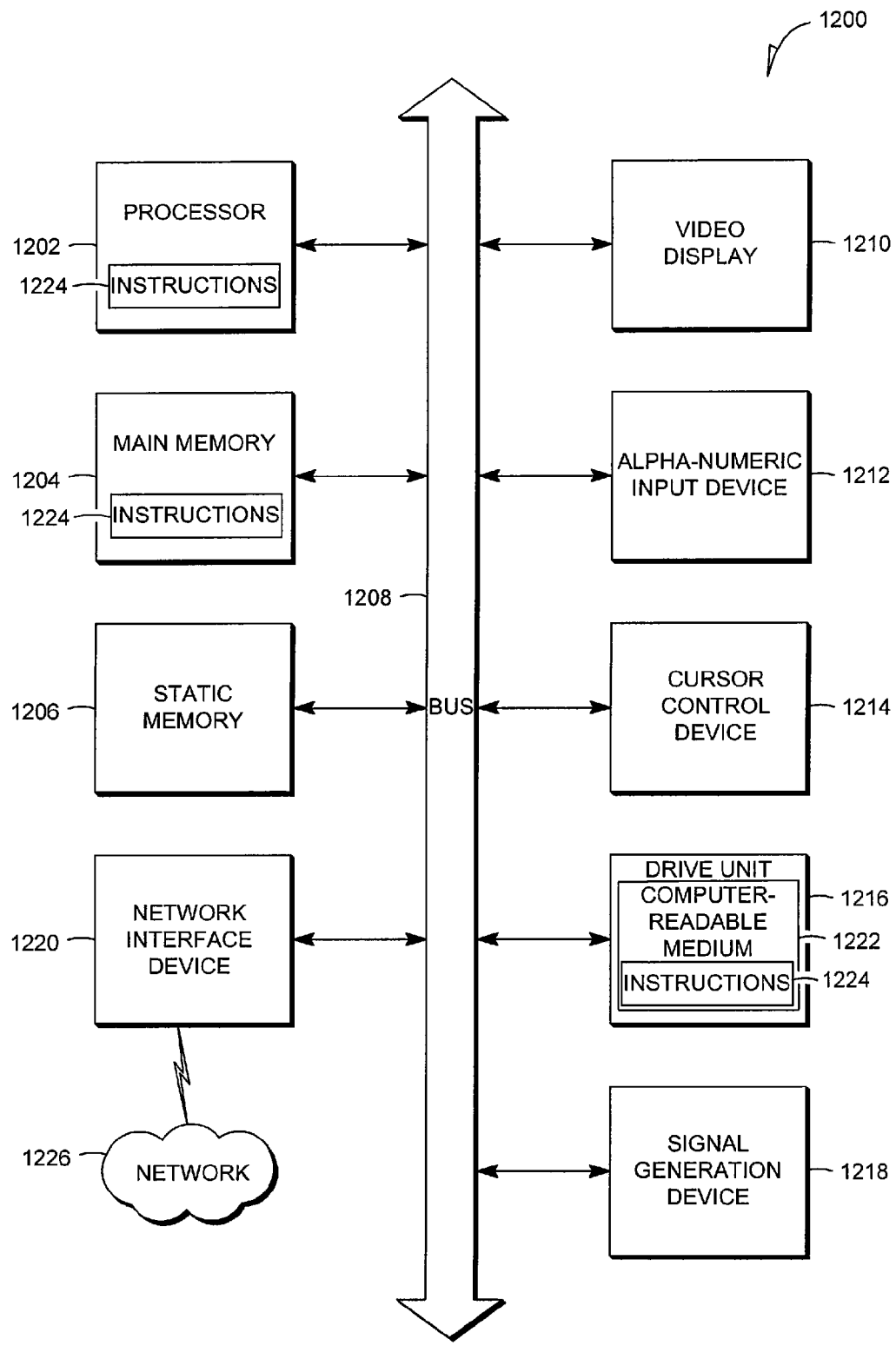
FIG. 12 is a block diagram diagrammatic representation of machine in the example form of a computer system within which a set of instructions, for causing the machine to perform any one or more of the methodologies discussed herein, may be executed.

FIG. 12 shows a diagrammatic representation of machine in the example form of a computer system 1200 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU) a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a drive unit 1216, a signal generation device 1218 (e.g., a speaker) and a network interface device 1220.

The drive unit 1216 includes a machine-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media.

The software 1224 may further be transmitted or received over a network 1226 via the network interface device 1220.

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for user-designed application deployment have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
at a server within a system, receiving a user-designed interface from a developer, the user-designed interface utilizing at least one high-level application program interface (API);
generating the at least one high-level API by:
receiving, from the developer, a selection of an existing plurality of low-level application program interfaces (APIs) that communicate with the server, and
combining the plurality of low-level APIs into the at least one high-level API;
at the server, deploying the user-designed interface to a user;
receiving a user request via the at least one high-level API;
at the server, processing the user request from the user;
tracking utilization of a resource of the system used by the user-designed interface;
providing a report of the utilization of the resource;
charging for the utilization of the resource of the system beyond a system threshold; and
denying access to the system through the user-designed interface when the utilization of the resource of the system exceeds the system threshold.

2. The method of claim 1, further comprising providing compensation based on at least one of:
the utilization of the resource by the user-designed interface, or
a number of transactions processed through use of the user-designed interface.

3. The method of claim 2, wherein the compensation is provided by at least one of:
an operator of the system,
a lister of an item available in the system through the user-designed interface, or
a purchaser of the item processed through use of the user-designed interface.

4. The method of 1, wherein the resource include at least one of:
a number of cycles of a central processing unit (CPU),
a memory, or
a number of system calls.

5. The method of claim 1, further comprising:
providing content through the user-designed interface in response to processing the user request.

6. The method of claim 1, wherein the user-designed interface includes user-provided content.

7. The method of claim 1, wherein the user request includes at least one of:
a selection of an item for purchase, or
a selection of an item for bid.

8. The method of claim 1, wherein receiving the user-designed application that utilizes the at least one high-level API further comprises:
posting a request for a feature that utilizes the at least one high-level API, the user-designed application to implement the feature.

9. The method of claim 8, wherein receiving the user-designed application that utilizes the at least one high-level API and implements the feature further comprises:
receiving a notification of intent to create the user-designed application that utilizes the at least one high-level API and implements the feature.

10. The method of claim 8, wherein receiving the user-designed application that utilizes the at least one high-level API and implements the feature further comprises:
determining that the user-designed application satisfies an acceptance criterion; and
compensating the developer of the user-designed application.

11. The method of claim 1, wherein receiving the user-designed application that utilizes the at least one high-level API further comprises:
posting a request for a feature that utilizes the at least one high-level API;
receiving a plurality of designed applications from a plurality of users that utilize the at least one high-level API and implements the feature; and
selecting the user-designed application from among the plurality of designed applications for deployment.

12. The method of claim 11, wherein selecting the user-designed application from the plurality of designed application for deployment further comprises:
compensating the developer of the user-designed application.

13. The method of claim 1, wherein receiving the user-designed application that utilizes the at least one high-level API comprises:
at the server, testing the at least one high-level API and the user-designed application.

14. The method of claim 1, wherein the system includes a grid management framework, the method further comprising:
managing a resource associated with the user-designed application in the grid management framework.

15. The method of claim 14, wherein the grid management framework is an enterprise grid alliance (EGA) framework.

16. The method of claim 1, wherein receiving the user-designed application that utilizes the at least one high-level API further comprises:
receiving programmable code for a service;
compiling the programmable code; and
accessing the compiled code.

17. The method of claim 1, wherein the system includes a distributed system, the distributed system capable of load-balancing.

18. The method of claim 1, wherein the user-designed application is a user-designed interface.

19. A method comprising:
receiving an access request for a system;
selecting a user-designed interface deployed at a server within the system, the user-designed interface utilizing at least one high-level API;
generating the at least one high level application program interfaces (APIs) based on:
receiving a selection of an existing plurality of low-level APIs that communicate with the server in the system;
combining the plurality of low-level APIs into the at least one high-level API in the system; and
receiving a user-designed interface that utilizes the at least one high-level API;
at the server, processing the user request utilizing the at least one high level API;
tracking utilization of a resource of the system used by the user-designed interface;
providing a report of the utilization of the resource;
charging for the utilization of the resource of the system beyond a system threshold; and
denying access to the system through the user-designed interface when the utilization of the resource of the system exceeds the system threshold.

20. The method of claim 19, further comprising:
providing content through the user-designed interface in response to processing the user request.

21. The method of claim 19, further comprising:
denying access through the user-designed interface when utilization of a resource of the system exceeds a system threshold.

22. The method of claim 19, wherein selecting the user-designed interface deployed comprises:
dynamically selecting the user-designed interface deployed at the server.

23. The method of claim 19, wherein selecting the user-designed interface deployed server-side within the system comprises:
identifying a plurality of available user-designed interfaces deployed at the server within the system; and
receiving a selection of the user-designed interface from the plurality of available user-designed interfaces.

24. A method comprising:
selecting an existing plurality of low-level application program interfaces (APIs) that communicate with a server in a system;
combining the plurality of low-level APIs into at least one high-level API;
creating a user-designed interface capable of utilizing the at least one high-level API when deployed in the system;
providing the selection of the plurality of low-level APIs, the at least one high level API, and the user-designed interface to an operator of the system;
at the server, deploying the user-designed interface to a user;
receiving a user request via the at least one high-level API;
at the server, processing the user request from the user using high-level API;
tracking utilization of a resource of the system used by the user-designed interface;
receiving a report of the utilization of the resource of the system by the user-designed interface;
providing compensation for the utilization of the resource of the system beyond a system threshold; and
being denied access to the system through the user-designed interface when the utilization of the resource of the system exceeds a system threshold.

25. The method of claim 24, further comprising:
receiving compensation from the operator of the system.

26. A system comprising:
a processor;
a memory; and
a receiver module at a server in the system, the receiver module to receive a user-designed application from a developer, the user-designed application utilizing at least one high-level application program interface (API), the receiver module further to generate the at least one high-level API using one or more processors, the one or more processors to:
receive, from the developer, a selection of an existing plurality of low-level application program interfaces (APIs) that communicate with the server, and
combine the plurality of low-level APIs into the at least one high-level API;
a deployment module to deploy the user-designed application at the server in the system;
a request processing module to process a user request for the user-designed application at the server in the system using the at least one high-level API;
a resource management module to track utilization of a resource of the system used by the user-designed interface and provide a report of the utilization of the resource; and
a content module to charge for the utilization of the resource of the system beyond a system threshold and deny access to the system through the user-designed interface when the utilization of the resource of the system exceeds the system threshold.

27. The system of claim 26, further comprising:
a selection module to select a user-designed interface deployed server-side within the system.

28. The system of claim 26, wherein
the resource management module is further to manage resources associated with the user-designed application.

29. A non-transitory machine-readable medium comprising instructions embodied thereon, which when executed by one or more machines, cause the one or more machines to perform a method comprising:
receiving a user-designed application from a developer, the user-designed application utilizing at least one high-level application program interface (API) available within a system;
generating the at least one high-level API by:
receiving, from the developer, a selection of an existing plurality of low-level application program interfaces (APIs) that communicate with a server in a system, and
combining the plurality of low-level APIs into the at least one high-level API;
deploying the user-designed application at the server within the system;
receiving a user request via the at least one high-level API;
processing a user request for the user-designed application at the server in the system;
tracking utilization of a resource of the system used by the user-designed interface;
providing a report of the utilization of the resource;
charging for the utilization of the resource of the system beyond a system threshold; and
denying access to the system through the user-designed interface when the utilization of the resource of the system exceeds the system threshold.

30. The non-transitory machine-readable medium of claim 29, wherein causing the one or more machines to receive the user-designed application that utilizes the at least one high-level API available within the system causes the one or more machines to perform a method comprising:
posting a request for a feature that utilizes the at least one high-level API available within the system;
receiving a plurality of designed applications from a plurality of users, the plurality of the designed applications to utilize the at least one high-level API available within the system and to implement the feature; and
selecting the user-designed application from among the plurality of designed applications for deployment.

* * * * *

UNITED STATES PATENT AND TRADEMARK OFFICE
CERTIFICATE OF CORRECTION

PATENT NO. : 8,621,490 B2  
APPLICATION NO. : 11/740689  
DATED : December 31, 2013  
INVENTOR(S) : Eric Noel Billingsley Page 1 of 1

It is certified that error appears in the above-identified patent and that said Letters Patent is hereby corrected as shown below:

In the Claims

In column 15, line 42, in Claim 4, before "1,", insert --claim--, therefor

Signed and Sealed this  
Twenty-fifth Day of November, 2014

Michelle K. Lee  
*Deputy Director of the United States Patent and Trademark Office*